(12) United States Patent
Xiong et al.

(10) Patent No.: US 12,248,884 B2
(45) Date of Patent: Mar. 11, 2025

(54) METHOD AND APPARATUS FOR KNOWLEDGE GRAPH CONSTRUCTION, STORAGE MEDIUM, AND ELECTRONIC DEVICE

(71) Applicant: Lemon Inc., Grand Cayman (KY)

(72) Inventors: Hongyu Xiong, Los Angeles, CA (US); Han Wang, Los Angeles, CA (US); Yuan Gao, Los Angeles, CA (US); Yiqi Feng, Los Angeles, CA (US); Bin Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/397,227

(22) Filed: Dec. 27, 2023

(65) Prior Publication Data

US 2024/0135196 A1  Apr. 25, 2024

Related U.S. Application Data

(63) Continuation of application No. PCT/SG2022/050578, filed on Aug. 15, 2022.

(30) Foreign Application Priority Data

Aug. 16, 2021 (CN) .......................... 202110939279.X

(51) Int. Cl.
*G06N 5/02* (2023.01)
*G06F 16/28* (2019.01)

(52) U.S. Cl.
CPC ............. *G06N 5/02* (2013.01); *G06F 16/288* (2019.01)

(58) Field of Classification Search
CPC ................................ G06N 5/02; G06F 16/288
See application file for complete search history.

(56) References Cited

FOREIGN PATENT DOCUMENTS

| CN | 106156365 A | 11/2016 |
| CN | 106484767 A | 3/2017 |

(Continued)

OTHER PUBLICATIONS

Zhong, Y., et al, A general method for tree-comparison based on subtree similarity and its use in a taxonomic database, [received on Apr. 20, 2024]. Retrieved from Internet: <https://www.sciencedirect.com/science/article/pii/S0303264797016845> (Year: 1997).*

(Continued)

*Primary Examiner* — Incent Gonzales
*Assistant Examiner* — Bart I Rylander
(74) *Attorney, Agent, or Firm* — Astute IP Law Group

(57) ABSTRACT

The present disclosure relates to a method and apparatus for knowledge graph construction, storage medium and electronic device. The method for knowledge graph construction, comprises: identifying an entity concept from a title text of a target web page and at least one entity corresponding to the entity concept from a body text of the target web page; constructing a syntax parse tree of the title text based on syntax parse rules of a language to which the title text belongs, and determining, from the syntax parse tree, a modifier for modifying the entity concept; and generating a knowledge graph based on the entity concept, the modifier, and the at least one entity. Through the solution of the present disclosure, knowledge graphs with high accuracy and high recall rates are constructed without structured processing on target web pages.

12 Claims, 7 Drawing Sheets

(56) References Cited

FOREIGN PATENT DOCUMENTS

| CN | 108694208 A | 10/2018 |
|---|---|---|
| CN | 108376160 A | 12/2018 |
| CN | 111177591 A | 5/2020 |

OTHER PUBLICATIONS

Cohen, S., et al, A General Algorithm for Subtree Similarity-Search, [received on Apr. 20, 2024]. Retrieved from Internet: <https://ieeexplore.ieee.org/abstract/document/6816712> (Year: 2014).*

Xue, Y., et al, Web page title extraction and its application, [received Aug. 6, 2024]. Retrieved from Internet:<https://www.sciencedirect.com/science/article/pii/S0306457306001981> (Year: 2007).*

Zhao, X., HDSKG: Harvesting Domain Specific Knowledge Graph from Content of Webpages, [received Apr. 20, 2024]. Retrieved from Internet: <https://ieeexplore.ieee.org/abstract/document/7884609> (Year: 2017).*

Wu, X., et al, The CRFs-Based Chinese Open Entity Relation Extraction, [received on Apr. 20, 2024]. Retrieved from Internet :<https:// ieeexplore.ieee.org/abstract/document/8005508> (Year: 2017).*

Kim, Y., et al, Web Information Extraction by HTML Tree Edit Distance Matching, [received on Apr. 20, 2024]. Retrieved from Internet :< https://ieeexplore.ieee.org/abstract/document/4420619> (Year: 2007).*

Kocher, D., et al, A Scalable Index for Top-K Subtree Similarity Queries, [received on Apr. 20, 2024]. Retrieved from Internet: <https://dl.acm.org/doi/abs/10.1145/3299869.3319892 (Year: 2019).*

International Search Report (with English translation) and Written Opinion issued in PCT/SG2022/050578, dated Feb. 28, 2023, 12 pages provided.

Office Action issued in corresponding Chinese Application No. 202110939279.X, dated Apr. 19, 2023, with English machine translation.

Peilu Wang, Knowledge Graph Construction and Applications for Web Search and Beyond, Data Intelligence, dated Nov. 1, 2019, pp. 333-349.

* cited by examiner

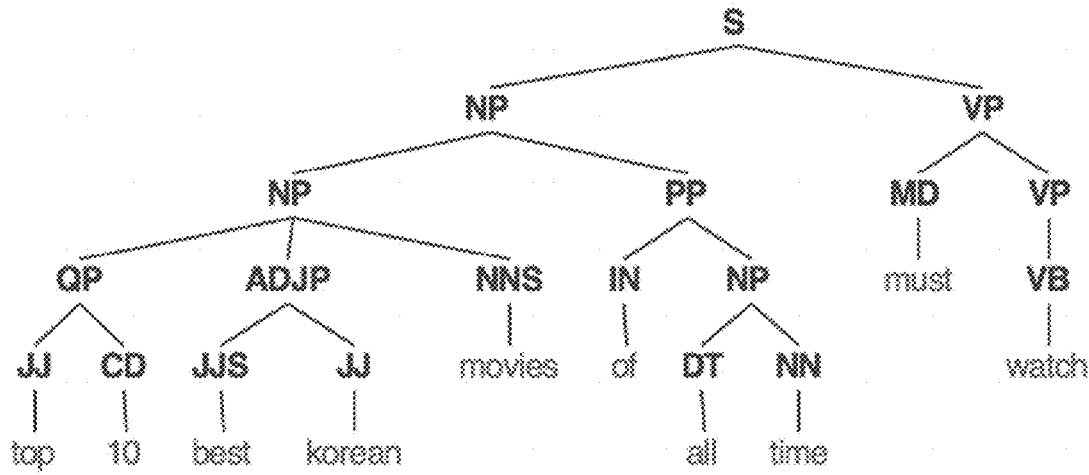
FIG. 2
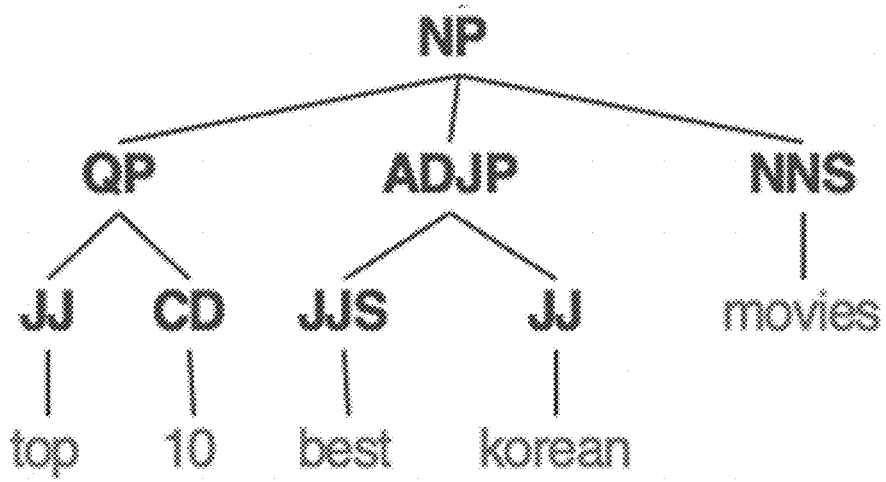
FIG. 3
FIG. 4

FIG. 6

FIRST ENCODING LABEL SUBTREE

SECOND ENCODING LABEL SUBTREE

METHOD AND APPARATUS FOR KNOWLEDGE GRAPH CONSTRUCTION, STORAGE MEDIUM, AND ELECTRONIC DEVICE

CROSS-REFERENCE TO RELATED APPLICATION(S)

This application is a continuation of International Patent Application No. PCT/SG2022/050578, filed on Aug. 15, 2022, which is based on and claims priority to Chinese Patent Application No. 202110939279.X, filed on Aug. 16, 2021, and entitled "METHOD AND APPARATUS FOR KNOWLEDGE GRAPH CONSTRUCTION, STORAGE MEDIUM, AND ELECTRONIC DEVICE", the entirety of which is herein incorporated by reference.

FIELD

The present disclosure relates to the field of knowledge graph technology, and in particular, to a method and apparatus for knowledge graph construction, a storage medium, and an electronic device.

BACKGROUND

A knowledge graph is a structured semantic knowledge base for describing concepts and their relations in the physical world in symbolic form, whose basic unit of composition is triple. Specifically, the triple can be interpreted as (entity, relation, entity). If an entity is considered as a node and a relation (including attributes, classes, and the like) is considered as an edge, entities are linked to each other through the relations, to construct a mesh knowledge structure. In such a way, a knowledge base that contains a large number of triples becomes a huge knowledge graph.

In related technologies, a knowledge graph is constructed through text mining, which usually performs structured processing on the corpus first to obtain structured data including subjects, predicates and objects, and then constructs a knowledge graph based on the obtained structured data. However, the recall rates and accuracy of this solution are not high.

SUMMARY

This section is provided to present to introduce the concepts of the present disclosure in brief, which will be described in detail later in the detailed description section. This section is neither intended to identify key or essential features of the technical solution of the claimed subject matter, nor is it intended to limit the scope of the technical solution of the claimed subject matter.

In a first aspect, the present disclosure provides a method for knowledge graph construction. The method comprises: identifying an entity concept from a title text of a target web page and at least one entity corresponding to the entity concept from a body text of the target web page; constructing a syntax parse tree of the title text based on syntax parse rules of a language to which the title text belongs, and determining, from the syntax parse tree, a modifier for modifying the entity concept; and generating a knowledge graph based on the entity concept, the modifier, and the at least one entity.

In a second aspect, the present disclosure provides an apparatus for knowledge graph construction. The apparatus comprises:

an identification module configured to identify an entity concept from a title text of a target web page and at least one entity corresponding to the entity concept from a body text of the target web page;

a construction module configured to construct a syntax parse tree of the title text based on syntax parse rules of a language to which the title text belongs, and determine, from the syntax parse tree, a modifier for modifying the entity concept; and a generation module configured to generate a knowledge graph based on the entity concept, the modifier, and the at least one entity.

In a third aspect, the present disclosure provides a computer-readable medium having a computer program stored thereon which, when executed by a processing means, perform the steps of the method according to any embodiments of the first aspect.

In a fourth aspect, the present disclosure provides an electronic device which comprises:

a storage device with a computer program stored thereon; and a processing device configured to execute the computer program in the storage device to perform the steps of the method according to any embodiments of the first aspect.

With the above technical solution, at least the following beneficial technical effects can be achieved:

An entity concept is identified from a title text of a target web page, and at least one entity corresponding to the entity concept is identified from a body text of the target web page. At the same time, a syntax parse tree of the title text is constructed based on syntax parse rules of a language to which the title text belongs, and a modifier for modifying the entity concept is determined from the syntax parse tree. A knowledge graph is generated based on the entity concept, the modifier, and the obtained entity. As can be seen, the present disclosure provides a novel method for knowledge graph construction without structured processing on the corpus (target web pages). Moreover, since this approach of the present disclosure can avoid structured processing on the corpus and can avoid the noise introduced by the structured processing, the recall and accuracy of the knowledge graph are improved.

Other features and advantages of the present disclosure will be described in detail in the following detailed description.

BRIEF DESCRIPTION OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar numerals indicate the same or similar elements. It should be understood that the accompanying drawings are schematic and that the parts and elements are not necessarily drawn to scale. In the accompanying drawings:

FIG. 2 illustrates a syntax parse tree according to an example embodiment of the present disclosure.

FIG. 3 illustrates a grammar analysis subtree according to an example embodiment of the present disclosure.

FIG. 4 illustrates page source code according to an example embodiment of the present disclosure.

FIG. 6 illustrates a target web page according to an example embodiment of the present disclosure.

DETAILED DESCRIPTION

Figure 1:
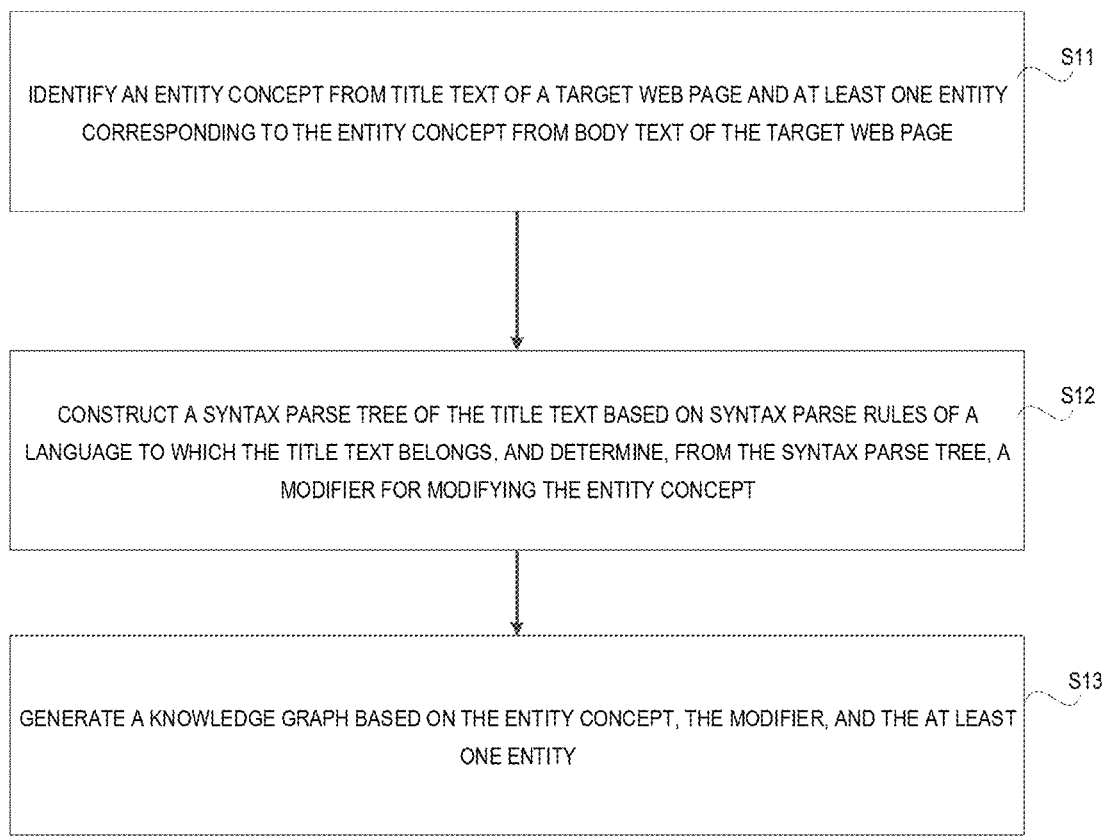
FIG. 1 illustrates a flowchart of a method for knowledge graph construction according to an example embodiment of the present disclosure.

The following embodiments of the present disclosure will be described with reference to the accompanying drawings. Although some embodiments of the present disclosure are shown in the drawings, the present disclosure can be implemented in various forms, and these embodiments are provided to understand the present disclosure. The drawings and embodiments of the present disclosure are for illustrative purposes only.

The multiple steps described in the method implementations of the present disclosure can be executed in different orders and/or in parallel. In addition, the method implementations can include additional steps and/or omit the steps shown. The scope of the present disclosure is not limited in this regard.

The term "include" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

The terms "first" and "second" mentioned in the present disclosure are only used to distinguish different devices, modules, or units, and are not used to limit the order or interdependence of the functions performed by these devices, modules, or units.

The modifications of "one" and "more" mentioned in the present disclosure are illustrative and not restrictive. Those skilled in the art should understand that unless otherwise indicated in the context, they should be understood as "one or more".

The names of the messages or information exchanged between multiple devices in the implementations of the present disclosure are for illustrative purposes only and are not intended to limit the scope of these messages or information.

Before illustrating detailed embodiments of the solution in the present disclosure, it should be noted that target web pages in the present disclosure are retrieved and used in compliance with laws.

FIG. 1 is a flowchart of a method for knowledge graph construction according to an example embodiment of the present disclosure. As shown in FIG. 1, the method for knowledge graph construction includes the following steps.

S11. Identify an entity concept from a title text of a target web page and at least one entity corresponding to the entity concept from a body text of the target web page.

The way to obtain the target web page in the present disclosure includes, but is not limited to, searching for keywords/sentences using a search engine.

It should be noted that the title text of the target web page is the text defined by a title label of the target web page, such as the text defined by a HTML <title> label. The title text of the target web page may be obtained by parsing it using a web page title parser. Alternatively, the title text of the target web page may be obtained by locating the text from page source code of the target web page based on the title label.

For example, in a possible embodiment, identifying the entity concept from the title text of the target web page includes:

obtaining page source code of the target web page; locating the title text from the page source code based on a title label; and matching the entity concept from the title text based on a predetermined set of entity concept words.

There are a plurality of entity concepts predefined in the predetermined set of entity concept words category. The entity concept carried in the title text is matched from the title text by matching keywords in the predetermined set of entity concept words category with the words in the title text. With this approach, the entity concept for constructing the knowledge graph can be quickly obtained from the title text.

Similarly, the body text of the target web page refers to a text defined by a body text label of the target web page, such as text defined by a HTML <body> label. The body text of the target web page may be obtained by parsing the body text using a web page body text parser. Alternatively, the body text may be obtained by locating the body text from the page source code of the target web page based on the body text label.

It is worth explaining that, in the present disclosure, an entity concept refers to a concept that reflects a concrete thing as an object, which is opposed to an "attribute concept" that is used to reflect an object itself rather than an attribute of the object. For example, the earth, an ocean, an animal, a table, a movie, etc. are all entity concepts.

Entities are something that have objective existence and can be distinguished from each other. For example, Movie 1 "XX" and Movie 2 "XXX" are entities corresponding to an entity concept of "movie".

As an example, it is assumed that the title text of the target web page is "top 10 best Korean movies of all time must watch". It can be identified from the title text that the entity concept is "movie", and one or more entities corresponding to the entity concept "movie" can be identified from the body text of the target webpage. For example, the entity may be Movie 5 "XXXX", Movie 6 "XXXXX", etc.

S12. Construct a syntax parse tree of the title text based on syntax parse rules of a language to which the title text belongs, and determine a modifier for modifying the entity concept from the syntax parse tree.

Since different languages correspond to different syntax parse rules, it is necessary to determine the language to which the title text belongs before constructing the syntax parse tree of the title text, and then construct the syntax parse tree of the title text based on the syntax parse rules of the language to which the title text belongs.

For example, if the language to which the title text belongs is English, the corresponding syntax parse rules are English syntax parse rules. If the language to which the title text belongs is Chinese, the corresponding syntax parse rules are Chinese syntax parse rules.

For example, it is assumed that the title text is "top 10 best Korean movies of all time must watch". According to English syntax parse rules, the syntax parse tree of the title text is constructed as shown in FIG. 2. As can be seen from FIG. 2, the modifier that modifies the entity concept "movie" is Korean.

In a possible embodiment, determining, from the syntax parse tree, the modifier for modifying the entity concept includes:

determining, from the syntax parse tree, a syntax subtree including the entity concept; determining a title text segment corresponding to the syntax subtree; and determining as the modifier an adjective in the title text segment that is closest to the entity concept.

Taking FIG. 2 as an example, a syntax subtree identified from the syntax parse tree shown in FIG. 2 that includes the entity concept "movie" is the syntax subtree shown in FIG. 3. It can be seen from FIG. 3 that the corresponding title text segment is "top 10 best Korean movies". The adjective (JJ) closest to the entity concept "movie" in the title text segment is "Korean", so the modifier that modifies the entity concept "movie" is Korean.

By adopting this way of constructing a syntax parse tree and determining from the syntax parse tree a modifier that modifies the entity concept, it enables fast and accurate identification of the modifier that modifies the entity concept. The accuracy of the knowledge graph can be improved in this way.

S13. Generate a knowledge graph based on the entity concept, the modifier, and the at least one entity.

After the entity concept and the modifier are identified from the title text of the target web page and the at least one entity corresponding to the entity concept is identified from the body text of the target web page, a knowledge graph may be generated based on the obtained entity concept, the modifier, and the entity.

As an example, the knowledge graph corresponding to a relational database is shown in the following table:

| Category (entity concept) | Modifier | Entity |
| --- | --- | --- |
| Movie | Science fiction | Movie 1, Movie 2, . . . |
| Movie | Suspense/Thriller | Movie 3, Movie 4, Movie 5, . . . |
| Movie | Comedy | . . . |

With the above method according to the present disclosure, an entity concept is identified from the title text of a target web page, and at least one entity corresponding to the entity concept is identified from the body text of the target web page. At the same time, a syntax parse tree of the title text is constructed based on syntax parse rules of a language to which the title text belongs, and a modifier for modifying the entity concept is determined from the syntax parse tree. A knowledge graph is generated based on the entity concept, the modifier, and the obtained entity. As can be seen, the present disclosure provides a novel method for knowledge graph construction without structuring the corpus (target web page). Moreover, since this approach of the present disclosure can avoid structured processing on the corpus and can avoid the noise introduced by the structured processing, the recall rate and accuracy of the knowledge graph are improved.

It is noted here that in step S12, a syntax parse tree of the title text is constructed based on syntax parse rules of a language to which the title text belongs, and a modifier for modifying the entity concept is determined from the syntax parse tree. Therefore, the application scenarios of the technical solution of the present disclosure may include searching, recommendation, and questioning and answering scenarios for a specific entity concept. The specific entity concept is characterized by a combination of a modifier and an entity concept. Examples of specific entity concepts are "Bollywood movies", "seafood restaurants", "science fiction", and the like. In other words, a knowledge graph based on a specific entity concept can be obtained using the above method according to the present disclosure.

In a possible embodiment, in step S11 as described above, identifying the at least one entity corresponding to the entity concept from the body text of the target web page specifically includes the steps of:

after obtaining page source code of the target web page, generating a coding label tree corresponding to the page source code based on encoding labels in the page source code; determining from the coding label tree a plurality of target encoding label subtrees having a similarity greater than a predetermined threshold; and for each of the target encoding label subtrees, determining the entity from a body text segment corresponding to the target encoding label subtree.

Figure 5:
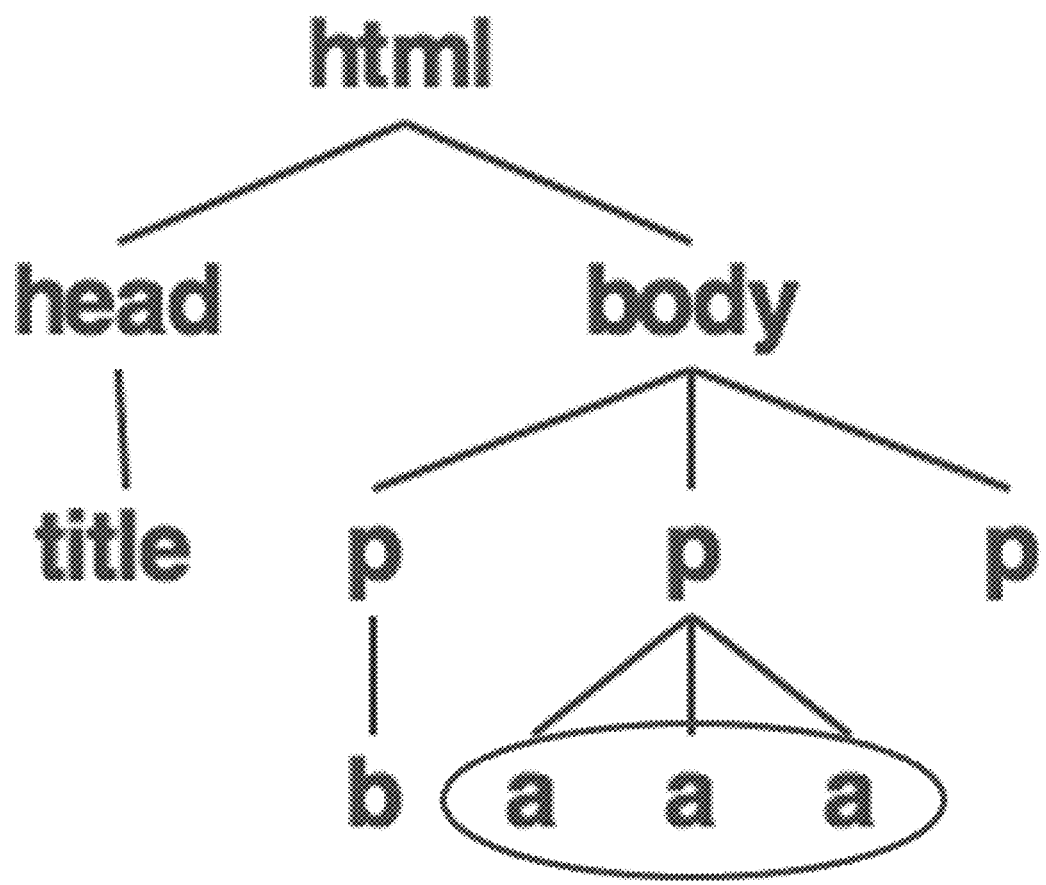
FIG. 5 illustrates a coding label tree corresponding to FIG. 4 according to an example embodiment of the present disclosure.

For example, it is assumed that the page source code of the target web page is as shown in FIG. 4. Based on the encoding labels in the page source code, such as <html>, <head>, <title>, <body>, <p>, <a>, the coding label tree corresponding to the page source code is generated as shown in FIG. 5. A plurality of target encoding label subtrees having a similarity greater than a predetermined threshold are determined from the coding label tree shown in FIG. 5, such as the three target encoding label subtrees in the circles of FIG. 5. For each of the target encoding label subtrees, the entity is determined from a body text segment corresponding to the target encoding label subtree. Three entities corresponding to the three target encoding label subtrees in the circles of FIG. 5 are Elsie, Lacies, and link3, respectively.

With this approach of constructing a coding label tree based on the page source code of the target web page, the entity in the body text can be identified quickly and more completely.

In a possible embodiment, a text pattern of the title text is a top K text pattern. For example, title texts in top K text pattern may be "best bollywood movies", "Top 6 Nikon Vinlabele Camera Lenses", "20 Most Influential Scientists Alive Today", "Twelve Most Interesting Children's Bookslin USA", "10|Hollywood1Classics You Shouldn't Miss", etc.

K may be determined by determining a syntax subtree from the syntax parse tree of the title text that includes the entity concept and determining, from the syntax subtree, a quantifier K corresponding to a cardinal number label.

To illustrate with the examples of FIG. 2 and FIG. 3, the syntax subtree determined from the syntax parse tree of the title text shown in FIG. 2 that includes the entity concept movie is as shown in FIG. 3. As can be seen from FIG. 3, the cardinal number label (CD) in this syntax subtree corresponds to the quantifier K of 10.

Accordingly, in accordance with a determination that the text pattern of the title text is a top K text pattern, determining, from the coding label tree, the plurality of target encoding label subtrees having a similarity greater than the predetermined threshold includes:

determining a target encoding label node from the coding label tree, the target encoding label node having a number of encoding label subtrees greater than or equal to K; and determining at least a number of K target encoding label subtrees from all encoding label subtrees under the target encoding label node.

Figure 6:
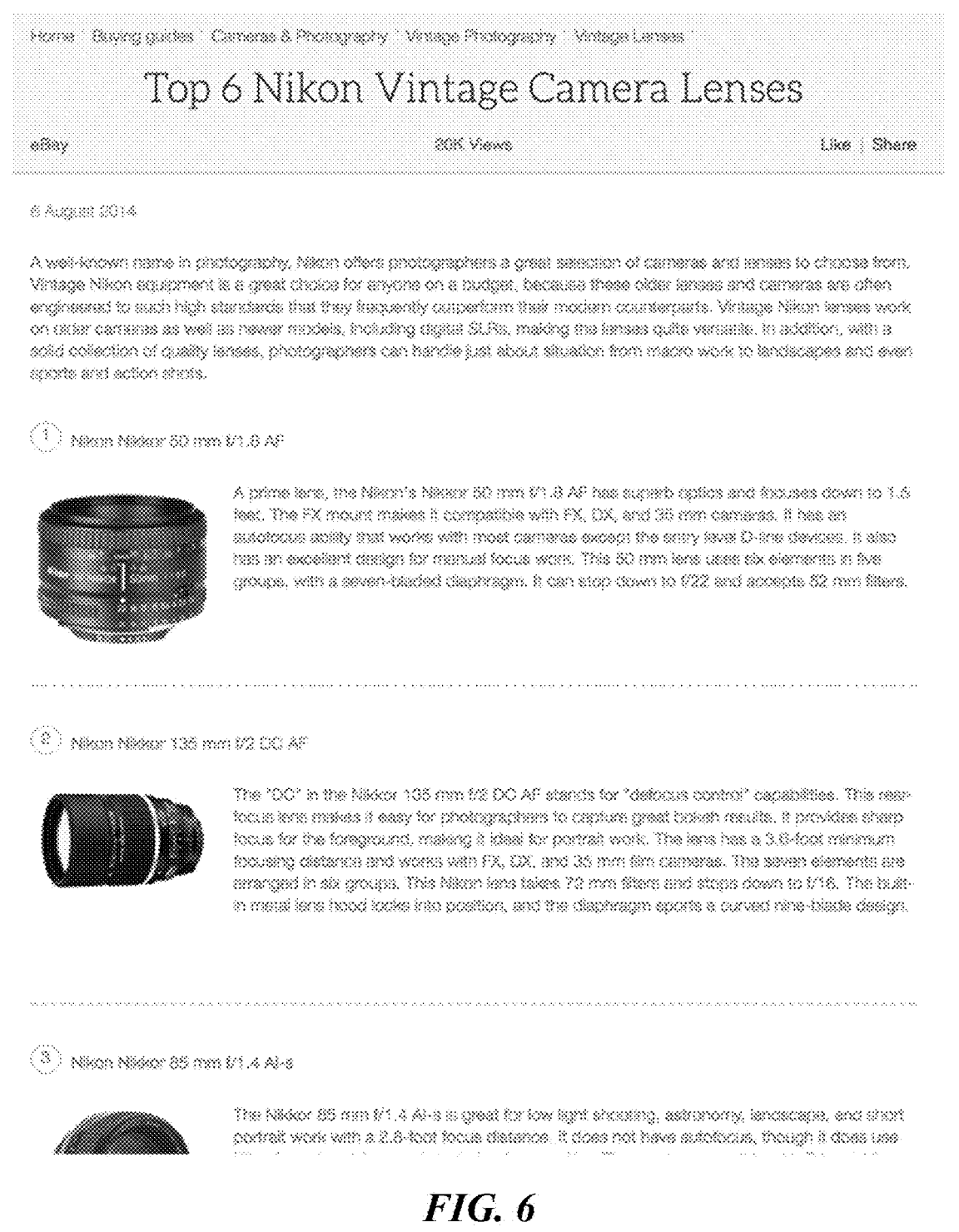
Figure 7:
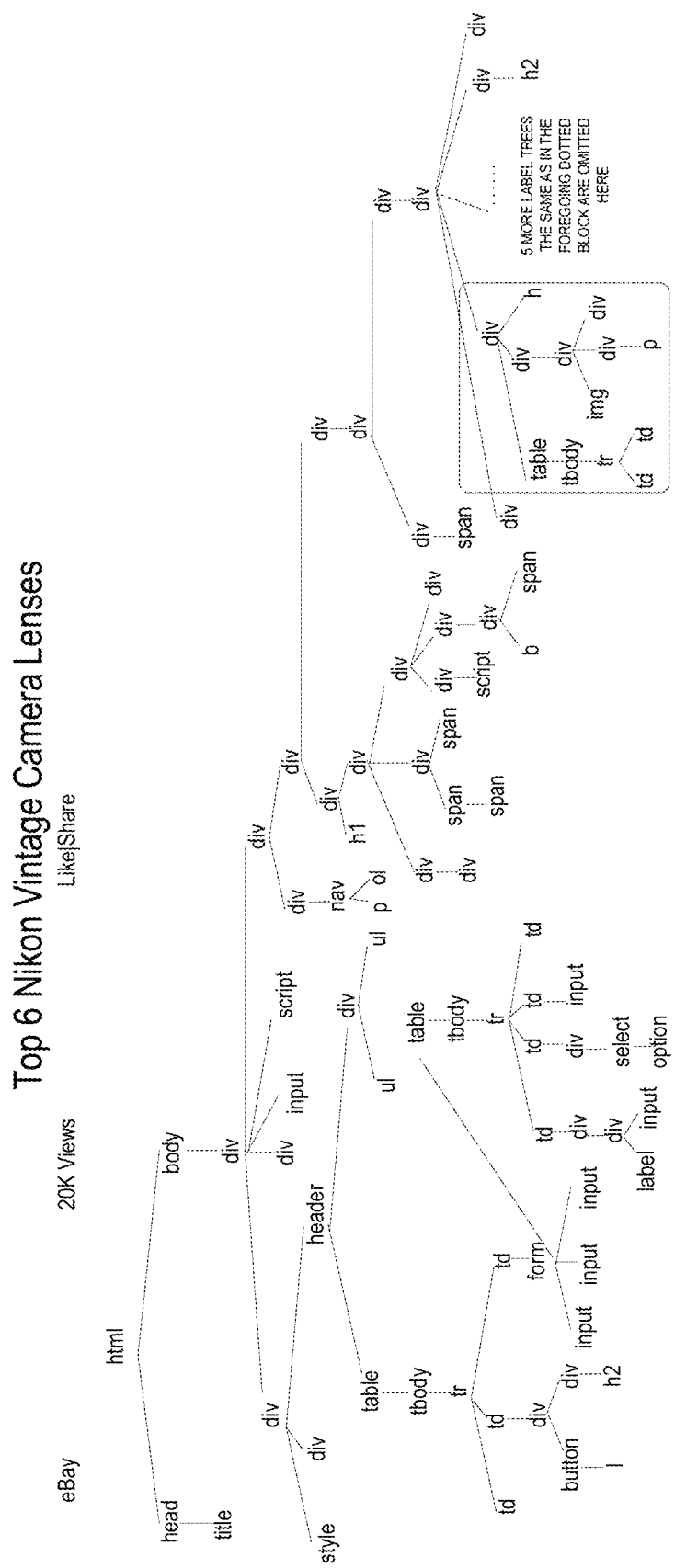
FIG. 7 illustrates a coding label tree corresponding to FIG. 6 according to an example embodiment of the present disclosure.

To illustrate with the examples of FIGS. 6 and 7, based on the target web page shown in FIG. 6, K may be determined to be 6 from the title text Top 6 Nikon Vintage Camera Lenses.

After obtaining the page source code of the target web page shown in FIG. 6, a coding label tree corresponding to the page source code is generated based on the encoding labels in the page source code as shown in FIG. 7. The target encoding label node is determined from the coding label tree shown in FIG. 7. The nine encoding label subtrees in the solid circles in FIG. 7 are encoding label subtrees under the target encoding label node. At least six target encoding label subtrees are determined from the nine encoding label subtrees under the target encoding label node, such as determining six target encoding label subtrees in the dotted circles in FIG. 7.

It is achievable to calculate a similarity between a first encoding label subtree and a second encoding label subtree of any two encoding label subtrees by the following:

in accordance with a determination that root nodes of the first encoding label subtree and the second encoding label subtree are not the same, determining the similarity between the first encoding label subtree and the second encoding label subtree is equal to 0 (s=0);

in accordance with a determination that the root nodes of the first encoding label subtree and the second encoding label subtree are the same, and that forward traversal results and backward traversal results of the first encoding label subtree and the second encoding label subtree are both the same, determining the similarity between the first encoding label subtree and the second encoding label subtree is equal to 1 (s=1); and in accordance with a determination that the root nodes of the first encoding label subtree and the second encoding label subtree are the same, and that the forward traversal results or the backward traversal results of the first encoding label subtree and the second encoding label subtree are not the same, determining the similarity between the two encoding label subtrees by calculating $$s = 0.5 + 0.5 \times \frac{1}{N}\sum_{i=1}^{N} S_i,$$

where N is a number of nodes at a first level in the first encoding label subtree, and $S_i$ is a similarity between a first subtree having the $i^{th}$ node among the first level of nodes of the first encoding label subtree as a root node and a second subtree having the $i^{th}$ node among the first level of nodes of the second encoding label subtree as a root node.

It should be noted that $S_i$ is calculated by treating the first subtree and the second subtree as two new encoding label subtrees, returning to perform the steps of the following: in accordance with a determination that the root nodes of the first encoding label subtree and the second encoding label subtree are not the same, determining the similarity between the first encoding label subtree and the second encoding label subtree is equal to 0 (s=0); or in accordance with a determination that the root nodes of the first encoding label subtree and the second encoding label subtree are the same and that forward traversal results and backward traversal results of the first encoding label subtree and the second encoding label subtree are both the same, determining the similarity between the first encoding label subtree and the second encoding label subtree is equal to 1 (s=1); or in accordance with a determination that the root nodes of the first encoding label subtree and the second encoding label subtree are the same, and that the forward traversal results or the backward traversal results of the first encoding label subtree and the second encoding label subtree are not the same, determining the similarity between the two encoding label subtrees by calculating $$s = 0.5 + 0.5 \times \frac{1}{N}\sum_{i=1}^{N} S_i;$$

until the new similarity $S_i$ between the two encoding label subtrees is obtained.

Figure 8:
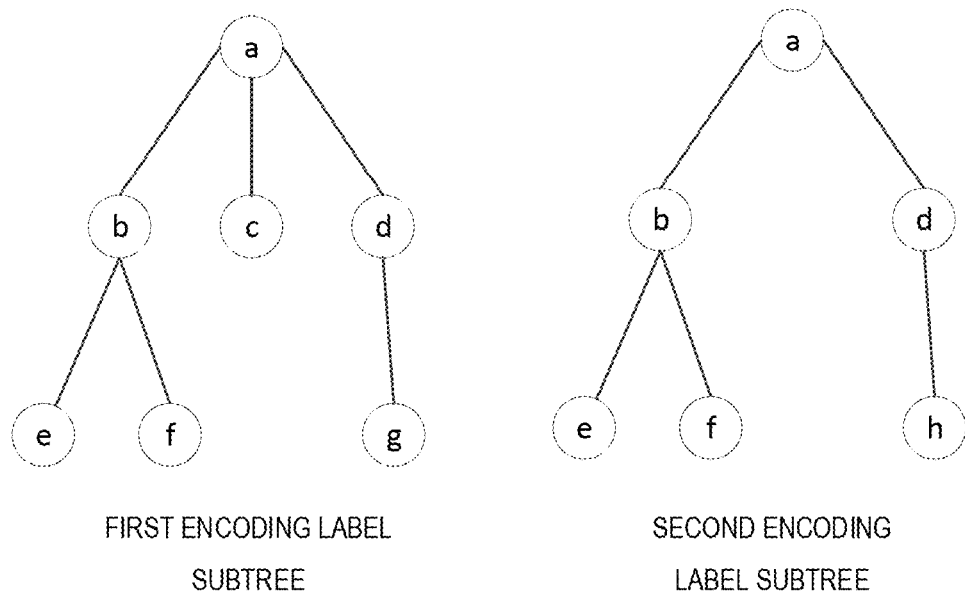
FIG. 8 illustrates a schematic diagram of a first encoding label subtree and a second encoding label subtree according to an example embodiment of the present disclosure.

Taking FIG. 8 as an example, the first encoding label subtree and the second encoding label subtree shown in FIG. 8 have the same root node, which is a. The first encoding label subtree has a forward traversal result of abefcdg, and the second encoding label subtree has a forward traversal result of abefdh, i.e., the first encoding label subtree and the second encoding label subtree do not share the same forward traversal result. As a result, the formula for calculating the similarity of the two encoding label subtrees in FIG. 8 may be determined as $$s = 0.5 + 0.5 \times \frac{1}{N}\sum_{i=1}^{N} S_i.$$

The nodes at the first level in the first encoding label subtree in FIG. 8 are b, c and d, respectively, with a total of three nodes, thus N is 3. The similarity between the first encoding label subtree and the second encoding label subtree is $$s = 0.5 + 0.5 \times \frac{1 + 0 + 0.5}{3} = 0.75.$$

N is the maximum value of the number of nodes at the first level in the two encoding label subtrees.

The above method for knowledge graph construction according to the present disclosure was validated with a dataset Movie-300, and the validation results were obtained as follows: Total 308; extractable 84; correct extraction 56; incorrect extraction 16, which shows that the recall of the knowledge graph constructed by the above method according to the present disclosure (calculated by: correct/extractable) is 66.70%, and the accuracy (calculated by: correct/(correct+incorrect)) is 77.80%.

Figure 9:
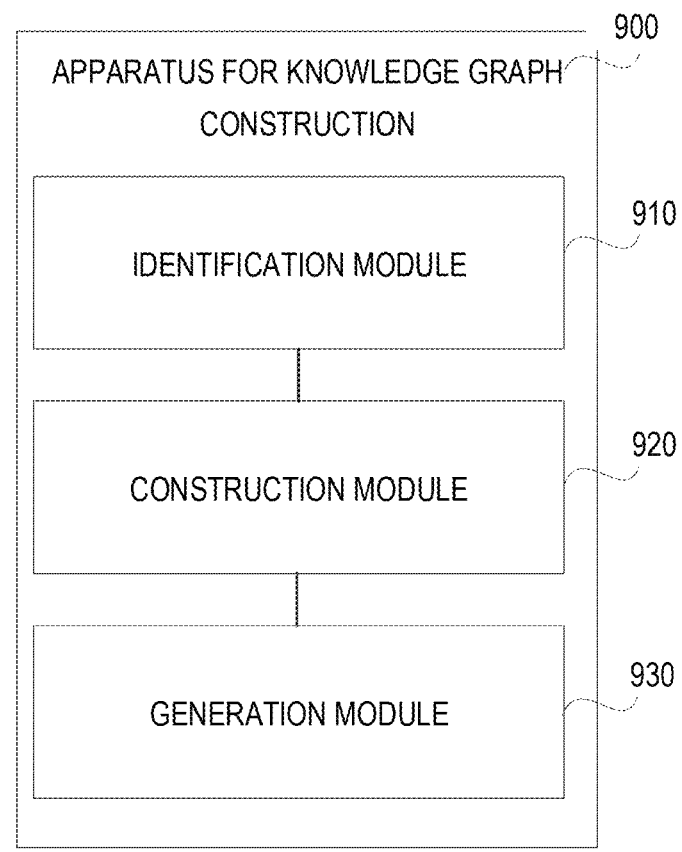
FIG. 9 illustrates a block diagram of an apparatus for knowledge graph construction according to an example embodiment of the present disclosure.

Based on the same inventive concept, embodiments of the present disclosure also provide a block diagram of an apparatus for knowledge graph construction. As shown in FIG. 9, the apparatus for knowledge graph construction 900 includes:

an identification module 910 configured to identify an entity concept from a title text of a target web page and at least one entity corresponding to the entity concept from a body text of the target web page;

a construction module 920 configured to construct a syntax parse tree of the title text based on syntax parse rules of a language to which the title text belongs, and determine, from the syntax parse tree, a modifier for modifying the entity concept; and a generation module 930 configured to generate a knowledge graph based on the entity concept, the modifier, and the at least one entity.

In a possible embodiment, the identification module comprises: an obtaining submodule configured to obtain page source code of the target web page; a locating submodule configured to locate the title text from the page source code based on a title label; and a matching submodule configured to match the entity concept from the title text based on a predetermined set of entity concept words.

In a possible embodiment, the construction module comprises: a first performing submodule configured to determine, from the syntax parse tree, a syntax subtree comprising the entity concept; a second performing submodule configured to determine a title text segment corresponding to the syntax subtree; and a third performing submodule configured to determine as the modifier an adjective in the title text segment that is closest to the entity concept.

In a possible embodiment, the identification module comprises: a generation submodule configured to, after obtaining the page source code of the target web page, generate a coding label tree corresponding to the page source code based on encoding labels in the page source code; a fourth performing submodule configured to determine, from the coding label tree, a plurality of target encoding label subtrees having a similarity greater than a predetermined threshold; and a fifth performing submodule configured to, for each of the target encoding label subtrees, determine the entity from a body text segment corresponding to the target encoding label subtree.

In a possible embodiment, a text pattern of the title text is a top K text pattern, and the fourth performing submodule is configured to: determine a target encoding label node from the coding label tree, the target encoding label node having a number of encoding label subtrees greater than or equal to K; and determine at least a number of K target encoding label subtrees from encoding label subtrees under the target encoding label node.

In a possible embodiment, the apparatus further comprises a calculating module configured to: calculate a similarity between a first encoding label subtree and a second encoding label subtree of any two encoding label subtrees by:

in accordance with a determination that root nodes of the first encoding label subtree and the second encoding label subtree are not the same, determining the similarity between the first encoding label subtree and the second encoding label subtree is equal to 0 (s=0); in accordance with a determination that the root nodes of the first encoding label subtree and the second encoding label subtree are the same, and that forward traversal results and backward traversal results of the first encoding label subtree and the second encoding label subtree are both the same, determining the similarity between the first encoding label subtree and the second encoding label subtree is equal to 1 (s=1); in accordance with a determination that the root nodes of the first encoding label subtree and the second encoding label subtree are the same, and that the forward traversal results or the backward traversal results of the first encoding label subtree and the second encoding label subtree are not the same, determining the similarity between the two encoding label subtrees by calculating $$s = 0.5 + 0.5 \times \frac{1}{N}\sum_{i=1}^{N} S_i,$$

where N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

In a possible embodiment, K is determined by: determining, from the syntax parse tree, a syntax subtree comprising the entity concept; and determining, from the syntax subtree, a quantifier K corresponding to a cardinal number label.

With the above apparatus according to the present disclosure, an entity concept is identified from a title text of a target web page, and at least one entity corresponding to the entity concept is identified from a body text of that target web page. At the same time, a syntax parse tree of the title text is constructed based on syntax parse rules of a language to which the title text belongs, and a modifier for modifying the entity concept is determined from the syntax parse tree. A knowledge graph is generated based on the entity concept, the modifier, and the obtained entity. As can be seen, the present disclosure provides a novel method for knowledge graph construction without structured processing on the corpus (target web pages). Moreover, since this approach of the present disclosure can avoid structured processing of the corpus and can avoid the noise introduced by the structured processing, the recall and accuracy of the knowledge graph are improved.

The specific implementation steps for each of the modules in the above-described apparatus have been described in detail in the method embodiments relating to the apparatus and will not be repeated herein.

Figure 10:
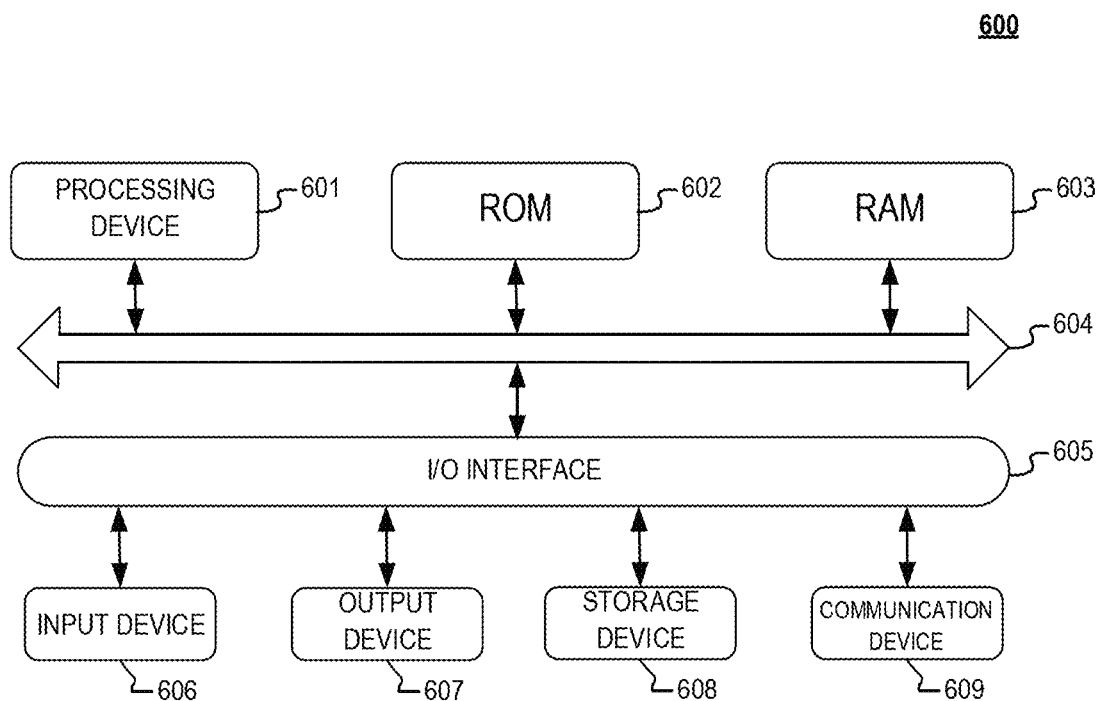
FIG. 10 illustrates a block diagram of an electronic device according to an example embodiment of the present disclosure.

Reference is made below to FIG. 10, which shows a schematic structure diagram suitable for implementing an electronic device 600 according to an embodiment of the present disclosure. The electronic device according to the embodiment of the present disclosure may include, but is not limited to, a mobile terminal such as a mobile phone, a notebook computer, a digital broadcast receiver, a personal digital assistant (PDA), a portable Android device (PAD), a portable multimedia player (PMP), a vehicle-mounted terminal (e.g., a vehicle-mounted navigation terminal), etc., and a fixed terminal such as a digital TV, a desktop computer, etc., or a server in various forms, such as a stand-alone server or a server cluster. The electronic device shown in FIG. 10 is merely an example and should not impose any limitations on the functionality and scope of use of the embodiments of the present disclosure.

As shown in FIG. 10, the electronic device 600 may include a processing device (e.g., a central processing device, a graphics processing device, etc.) 601, which may perform a variety of appropriate actions and processing according to a program stored in a read-only memory (ROM) 602 or a program loaded from a storage device 608 to a random access memory (RAM) 603. A variety of programs and data necessary for the operation of the electronic device 600 are also stored in the RAM 603. The processing device 601, the ROM 602 and the RAM 603 are connected to one another through a bus 604. An input/output (I/O) interface 605 is also connected to the bus 604.

In general, the following apparatuses may be connected to the I/O interface 605: an input device 606, such as a touch screen, a touch pad, a keyboard, a mouse, a camera, a microphone, an accelerometer, a gyroscope, etc.; an output device 607, such as a liquid crystal display (LCD), a speaker, a vibrator, etc.; a storage device 608, such as magnetic tape, a hard disk, etc.; and a communication device 609. The communication device 609 may allow the electronic device 600 to communicate with other devices in a wireless or wired way to exchange data. Although FIG. 10 shows the electronic device 600 having a plurality of devices, it should be understood that the electronic device 600 is not limited to implement or include all of the apparatuses shown. Alternatively, the electronic device 600 may implement or include more devices or fewer devices than those shown in the figure.

According to the embodiments of the present disclosure, the process described above with reference to the flowchart may be implemented as a computer software program. For example, the embodiments of the present disclosure include a computer program product comprising a computer program carried on a computer-readable medium. The computer program comprises program codes used for executing a method for recommendation of words. In such an embodiment, the computer program may be downloaded and installed from a network through the communication device 609, or installed from the storage device 608, or installed from the ROM 602. When the computer program is executed by the processing device 601, the above-mentioned functions defined in the method according to the embodiment of the present disclosure are executed.

It should be noted that the computer-readable storage medium mentioned above in the present disclosure may be a computer-readable signal medium or a computer-readable storage medium, or any combination of the two. The computer-readable storage medium may be, but not limited to, for example, an electrical, magnetic, optical, electromagnetic, infrared, or semiconductor-based system, apparatus or device, or any combination thereof. More specific examples of the computer-readable storage medium may include but are not limited to: an electrical connection having one or more conducting wires, a portable computer disk, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, the computer-readable storage medium may be any tangible medium that comprises or stores a program that may be used by or in combination with an instruction execution system, apparatus or device. In the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may also be any computer-readable medium other than a computer-readable storage medium; and the computer-readable signal medium may send, propagate or transmit a program that is used by or in combination with an instruction execution system, apparatus or device. The program codes that the computer-readable medium comprises may be transmitted by means of any suitable medium, including but not limited to: an electric wire, an optical cable, a radio frequency (RF), etc., or any suitable combination thereof. The computer-readable storage medium may be a non-transient computer-readable storage medium.

In some embodiments, a client and a server may communicate by means of any network protocol that is known at present or developed in the future, such as a hypertext transfer protocol (HTTP), and may be interconnected with digital data communication (e.g., a communication network) of any form or medium. Examples of the communication network include a local area network (LAN), a wide area network (WAN), an internetwork (e.g., the Internet) and an end-to-end network (e.g., an ad hoc end-to-end network), and any networks that are known at present or developed in the future.

The above-mentioned computer-readable medium may be contained in the above-mentioned electronic device, and may also exist independently without being installed in the electronic device.

The above-mentioned computer-readable medium carries one or more programs. When the one or more programs are executed by the electronic device, the electronic device is enabled to implement the following steps: identifying an entity concept from a title text of a target web page and at least one entity corresponding to the entity concept from a body text of the target web page; constructing a syntax parse tree of the title text based on syntax parse rules of a language to which the title text belongs, and determining, from the syntax parse tree, a modifier for modifying the entity concept; and generating a knowledge graph based on the entity concept, the modifier, and the at least one entity.

Computer program codes for performing the operations of the present disclosure may be written in one or more programming languages or a combination thereof, including object-oriented programming languages such as Java, Smalltalk, C++, etc., and conventional procedural programming languages such as "C" or similar programming languages. The program codes may be executed completely on a user computer, partially on the user computer, as an independent software package, partially on the user computer and partially on a remote computer, or completely on a remote computer or server. In a case involving the remote computer, the remote computer may be connected to the user computer through any type of network, including a LAN or a WAN, or may be connected to an external computer (for example, through the Internet by using an Internet service provider).

The flowcharts and block diagrams in the accompanying drawings illustrate architectures, functions, and operations that may be realized in accordance with the systems, methods, and computer program products of various embodiments of the present disclosure. In this regard, each block in the flowchart or block diagram may represent a module, a program segment, or part of the codes, which comprises one or more executable instructions for implementing specified logical functions. It should also be noted that in some alternative implementations, functions indicated in the blocks may also be implemented in an order different from that indicated in the drawings. For example, two blocks represented in succession may be executed basically in parallel in fact, and sometimes they may also be executed in reverse order, depending on the function involved. It should also be noted that each block in the block diagram and/or flowchart, as well as a combination of the blocks in the block diagram and/or flowchart, may be implemented with a dedicated hardware-based system that executes a specified function or operation, or with a combination of dedicated hardware and computer instructions.

Modules described in the embodiments of the present disclosure may be implemented by means of software or hardware. The names of the units do not limit the units in some cases.

The functions described herein can be executed at least in part by one or more hardware logic components. For example, without limitation, example types of hardware logic components that may be used include: a field programmable gate array (FPGA), an application-specific integrated circuit (ASIC), an application-specific standard product (ASSP), a system-on-chip (SOC), a complex programmable logic device (CPLD), etc.

In the context of the present disclosure, a machine-readable medium may be a tangible medium that may comprise or store a program for use by or in combination with an instruction execution system, apparatus or device. The machine-readable storage medium may be a machine-readable signal medium or machine-readable storage medium. The machine-readable medium may be, but not limited to, an electronic, magnetic, optical, electromagnetic, infrared, or semiconductor-based system, apparatus or device, or any combination thereof. More specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing.

According to one or more embodiments of the present disclosure, Example 1 provides a method for knowledge graph construction, comprising: identifying an entity concept from a title text of a target web page and at least one entity corresponding to the entity concept from a body text of the target web page; constructing a syntax parse tree of the title text based on syntax parse rules of a language to which the title text belongs, and determining, from the syntax parse tree, a modifier for modifying the entity concept; and generating a knowledge graph based on the entity concept, the modifier, and the at least one entity.

According to one or more embodiments of the present disclosure, Example 2 provides the method of Example 1, wherein identifying the entity concept from the title text of the target web page comprises: obtaining page source code of the target web page; locating the title text from the page source code based on a title label; and matching the entity concept from the title text based on a predetermined set of entity concept words.

According to one or more embodiments of the present disclosure, Example 3 provides the method of Example 1, wherein determining, from the syntax parse tree, the modifier for modifying the entity concept comprises: determining, from the syntax parse tree, a syntax subtree comprising the entity concept; determining a title text segment corresponding to the syntax subtree; and determining as the modifier an adjective in the title text segment that is closest to the entity concept.

According to one or more embodiments of the present disclosure, Example 4 provides the method of any of Examples 1 to 3, wherein identifying the at least one entity corresponding to the entity concept from the body text of the target web page comprises: after obtaining the page source code of the target web page, generating a coding label tree corresponding to the page source code based on encoding labels in the page source code; determining, from the coding label tree, a plurality of target encoding label subtrees having a similarity greater than a predetermined threshold; and for each of the target encoding label subtrees, determining the entity from a body text segment corresponding to the target encoding label subtree.

According to one or more embodiments of the present disclosure, Example 5 provides the method of Example 4, wherein a text pattern of the title text is a top K text pattern, and determining, from the coding label tree, the plurality of target encoding label subtrees having the similarity greater than the predetermined threshold comprises: determining a target encoding label node from the coding label tree, the target encoding label node having a number of encoding label subtrees greater than or equal to K; and determining at least a number of K target encoding label subtrees from encoding label subtrees under the target encoding label node.

According to one or more embodiments of the present disclosure, Example 6 provides the method of Example 5, wherein the method further comprises: calculating a similarity between a first encoding label subtree and a second encoding label subtree of any two encoding label subtrees by: in accordance with a determination that root nodes of the first encoding label subtree and the second encoding label subtree are not the same, determining the similarity between the first encoding label subtree and the second encoding label subtree is equal to 0 (s=0); in accordance with a determination that the root nodes of the first encoding label subtree and the second encoding label subtree are the same, and that forward traversal results and backward traversal results of the first encoding label subtree and the second encoding label subtree are both the same, determining the similarity between the first encoding label subtree and the second encoding label subtree is equal to 1 (s=1); in accordance with a determination that the root nodes of the first encoding label subtree and the second encoding label subtree are the same, and that the forward traversal results or the backward traversal results of the first encoding label subtree and the second encoding label subtree are not the same, determining the similarity between the two encoding label subtrees by calculating $$s = 0.5 + 0.5 \times \frac{1}{N} \sum_{i=1}^{N} S_i,$$

where N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

According to one or more embodiments of the present disclosure, Example 7 provides the method of Example 5, wherein K is determined by: determining, from the syntax parse tree, a syntax subtree comprising the entity concept; and determining, from the syntax subtree, a quantifier K corresponding to a cardinal number label.

According to one or more embodiments of the present disclosure, Example 8 provides an apparatus for knowledge graph construction, comprising: an identification module configured to identify an entity concept from a title text of a target web page and at least one entity corresponding to the entity concept from a body text of the target web page; a construction module configured to construct a syntax parse tree of the title text based on syntax parse rules of a language to which the title text belongs, and determine, from the syntax parse tree, a modifier for modifying the entity concept; and a generation module configured to generate a knowledge graph based on the entity concept, the modifier, and the at least one entity.

According to one or more embodiments of the present disclosure, Example 9 provides the apparatus of Example 8, the identification module comprises: an obtaining submodule configured to obtain page source code of the target web page; a locating submodule configured to locate the title text from the page source code based on a title label; and a matching submodule configured to match the entity concept from the title text based on a predetermined set of entity concept words.

According to one or more embodiments of the present disclosure, Example 10 provides the apparatus of Example 8, the construction module comprises: a first performing submodule configured to determine, from the syntax parse tree, a syntax subtree comprising the entity concept; a second performing submodule configured to determine a title text segment corresponding to the syntax subtree; and a third performing submodule configured to determine as the modifier an adjective in the title text segment that is closest to the entity concept.

According to one or more embodiments of the present disclosure, Example 11 provides the apparatus of Examples 8 to 10, the identification module comprises: a generation submodule configured to, after obtaining the page source code of the target web page, generate a coding label tree corresponding to the page source code based on encoding labels in the page source code; a fourth performing submodule configured to determine, from the coding label tree, a plurality of target encoding label subtrees having a similarity greater than a predetermined threshold; and a fifth performing submodule configured to, for each of the target encoding label subtrees, determine the entity from a body text segment corresponding to the target encoding label subtree.

According to one or more embodiments of the present disclosure, Example 12 provides the apparatus of Example 11, a text pattern of the title text is a top K text pattern, and the fourth performing submodule is configured to: determine a target encoding label node from the coding label tree, the target encoding label node having a number of encoding label subtrees greater than or equal to K; and determine at least a number of K target encoding label subtrees from encoding label subtrees under the target encoding label node.

According to one or more embodiments of the present disclosure, Example 13 provides the apparatus of Example 12, the apparatus further comprises a calculating module configured to: calculate a similarity between a first encoding label subtree and a second encoding label subtree of any two encoding label subtrees by:
in accordance with a determination that root nodes of the first encoding label subtree and the second encoding label subtree are not the same, determining the similarity between the first encoding label subtree and the second encoding label subtree is equal to 0 (s=0); in accordance with a determination that the root nodes of the first encoding label subtree and the second encoding label subtree are the same, and that forward traversal results and backward traversal results of the first encoding label subtree and the second encoding label subtree are both the same, determining the similarity between the first encoding label subtree and the second encoding label subtree is equal to 1 (s=1); in accordance with a determination that the root nodes of the first encoding label subtree and the second encoding label subtree are the same, and that the forward traversal results or the backward traversal results of the first encoding label subtree and the second encoding label subtree are not the same, determining the similarity between the two encoding label subtrees by calculating $$s = 0.5 + 0.5 \times \frac{1}{N} \sum_{i=1}^{N} S_i,$$

where N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

According to one or more embodiments of the present disclosure, Example 14 provides the apparatus of Example 12, K is determined by: determining, from the syntax parse tree, a syntax subtree comprising the entity concept; and determining, from the syntax subtree, a quantifier K corresponding to a cardinal number label.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, while the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logical actions, it should be understood that the subject matter limited in the appended claims is not necessarily limited to the particular features or actions described above. Rather, the particular features and actions described above are merely example forms of implementing the claims. With respect to the apparatus in the above embodiments, the specific manner in which the individual modules perform the operations has been described in detail in the embodiments relating to the method, and will not be described in detail herein.

We claim:

1. A method for knowledge graph construction, comprising:
   identifying, through a processing device and by using a web page parser, an entity concept from a title text of the target web page and at least one entity corresponding to the entity concept from a body text of the target web page;
   constructing, through the processing device, a syntax parse tree of the title text based on syntax parse rules of a language to which the title text belongs, and determining, from the syntax parse tree, a modifier for modifying the entity concept through the processing device; and
   generating, through the electronic device, a knowledge graph based on the entity concept, the modifier, and the at least one entity;
   wherein identifying, through the processing device, the at least one entity corresponding to the entity concept from the body text of the target web page comprises:
   after obtaining page source code of the target web page, generating, through the processing device, a coding label tree corresponding to the page source code based on encoding labels in the page source code;
   determining, from the coding label tree, a plurality of target encoding label subtrees having a similarity greater than a predetermined threshold through the processing device; and
   for each of the target encoding label subtrees, determining, through the processing device, the entity from a body text segment corresponding to the target encoding label subtree;
   wherein a text pattern of the title text is a top K text pattern, and determining, from the coding label tree, the plurality of target encoding label subtrees having the similarity greater than the predetermined threshold through the processing device, comprises:
   determining, through the processing device, a target encoding label node from the coding label tree, the target encoding label node having a number of encoding label subtrees greater than or equal to a predetermined number; and
   determining, through the processing device, at least the predetermined number of target encoding label subtrees from encoding label subtrees under the target encoding label node;
   wherein the predetermined number is determined by:
   determining, from the syntax parse tree, a syntax subtree comprising the entity concept through the processing device; and
   determining, from the syntax subtree, a quantifier K corresponding to a cardinal number label through the processing device.

2. The method of claim 1, wherein identifying, through the processing device and by using the web page parser, the entity concept from the title text of the target web page comprises:
   obtaining, by using the web page parser, the page source code of the target web page;
   locating, through the processing device, the title text from the page source code based on a title label; and
   matching, through the processing device, the entity concept from the title text based on a predetermined set of entity concept words.

3. The method of claim 1, wherein determining, from the syntax parse tree, the modifier for modifying the entity concept through the processing device comprises:
   determining, through the processing device, a title text segment corresponding to the syntax subtree; and
   determining, through the processing device, as the modifier an adjective in the title text segment that is closest to the entity concept.

4. The method of claim 1, wherein the method further comprises: calculating, through the processing device, a similarity between a first encoding label subtree and a second encoding label subtree of any two encoding label subtrees by:
   in accordance with a determination that root nodes of the first encoding label subtree and the second encoding label subtree are not the same, determining, through the processing device, the similarity between the first encoding label subtree and the second encoding label subtree is equal to 0;
   in accordance with a determination that the root nodes of the first encoding label subtree and the second encoding label subtree are the same, and that forward traversal results and backward traversal results of the first encoding label subtree and the second encoding label subtree are both the same, determining, through the processing device, the similarity between the first encoding label subtree and the second encoding label subtree is equal to 1;
   in accordance with a determination that the root nodes of the first encoding label subtree and the second encoding label subtree are the same, and that the forward traversal results or the backward traversal results of the first encoding label subtree and the second encoding label subtree are not the same, determining, through the processing device, the similarity between the two encoding label subtrees by calculating $$s = 0.5 + 0.5 \times \frac{1}{N}\sum\nolimits_{i=1}^{N} S_i,$$

where s represents the similarity between the two encoding label subtrees, N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

5. An electronic device, comprising:
   a storage device with a computer program stored thereon; and
   a processing device configured to execute the computer program in the storage device to perform acts comprising:
   identifying, through the processing device and by using a web page parser, an entity concept from a title text of the target web page and at least one entity corresponding to the entity concept from a body text of the target web page;
   constructing, through the processing device, a syntax parse tree of the title text based on syntax parse rules of a language to which the title text belongs, and determining, from the syntax parse tree, a modifier for modifying the entity concept; and
   generating, through the processing device, a knowledge graph based on the entity concept, the modifier, and the at least one entity;

wherein identifying, through the processing device, the at least one entity corresponding to the entity concept from the body text of the target web page comprises:

after obtaining page source code of the target web page, generating, through the processing device, a coding label tree corresponding to the page source code based on encoding labels in the page source code;

determining, from the coding label tree, a plurality of target encoding label subtrees having a similarity greater than a predetermined threshold through the processing device; and for each of the target encoding label subtrees, determining, through the processing device, the entity from a body text segment corresponding to the target encoding label subtree;

wherein a text pattern of the title text is a top K text pattern, and determining, from the coding label tree, the plurality of target encoding label subtrees having the similarity greater than the predetermined threshold through the processing device, comprises:

determining, through the processing device, a target encoding label node from the coding label tree, the target encoding label node having a number of encoding label subtrees greater than or equal to a predetermined number; and determining, through the processing device, at least the predetermined number of target encoding label subtrees from encoding label subtrees under the target encoding label node;

wherein the predetermined number is determined by:
determining, from the syntax parse tree, a syntax subtree comprising the entity concept through the processing device; and determining, from the syntax subtree, a quantifier K corresponding to a cardinal number label through the processing device.

6. The electronic device of claim 5, wherein identifying, through the processing device and by using the web page parser, the entity concept from the title text of the target web page comprises:

obtaining, by using the web page parser, the page source code of the target web page;

locating, through the processing device, the title text from the page source code based on a title label; and matching, through the processing device, the entity concept from the title text based on a predetermined set of entity concept words.

7. The electronic device of claim 5, wherein determining, from the syntax parse tree, the modifier for modifying the entity concept through the processing device comprises:

determining, through the processing device, a title text segment corresponding to the syntax subtree; and determining, through the processing device, as the modifier an adjective in the title text segment that is closest to the entity concept.

8. The electronic device of claim 5, wherein the acts further comprise: calculating, through the processing device, a similarity between a first encoding label subtree and a second encoding label subtree of any two encoding label subtrees by:

in accordance with a determination that root nodes of the first encoding label subtree and the second encoding label subtree are not the same, determining, through the processing device, the similarity between the first encoding label subtree and the second encoding label subtree is equal to 0;

in accordance with a determination that the root nodes of the first encoding label subtree and the second encoding label subtree are the same, and that forward traversal results and backward traversal results of the first encoding label subtree and the second encoding label subtree are both the same, determining, through the processing device, the similarity between the first encoding label subtree and the second encoding label subtree is equal to 1;

in accordance with a determination that the root nodes of the first encoding label subtree and the second encoding label subtree are the same, and that the forward traversal results or the backward traversal results of the first encoding label subtree and the second encoding label subtree are not the same, determining, through the processing device, the similarity between the two encoding label subtrees by calculating $$s = 0.5 + 0.5 \times \frac{1}{N}\sum_{i=1}^{N} S_i,$$

where s represents the similarity between the two encoding label subtrees, N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

9. A non-transitory computer-readable medium having a computer program stored thereon which, when executed by a processing device, performs acts comprising:

obtaining, through the processing device, a target web page by searching for a keyword or sentence using a search engine;

identifying, through the processing device and by using a web page parser, an entity concept from a title text of the target web page and at least one entity corresponding to the entity concept from a body text of the target web page, wherein the title text and the body text are obtained by invoking page source code of the target web page;

constructing, through the processing device, a syntax parse tree of the title text based on syntax parse rules of a language to which the title text belongs, and determining, from the syntax parse tree, a modifier for modifying the entity concept, through the processing device; and generating, through the processing device, a knowledge graph based on the entity concept, the modifier, and the at least one entity;

wherein identifying, through the processing device, the at least one entity corresponding to the entity concept from the body text of the target web page comprises:

after obtaining the page source code of the target web page, generating, through the processing device, a coding label tree corresponding to the page source code based on encoding labels in the page source code;

determining, from the coding label tree, a plurality of target encoding label subtrees having a similarity greater than a predetermined threshold through the processing device; and for each of the target encoding label subtrees, determining, through the processing device, the entity from a body text segment corresponding to the target encoding label subtree;

wherein a text pattern of the title text is a top K text pattern, and determining, from the coding label tree, the plurality of target encoding label subtrees having the similarity greater than the predetermined threshold through the processing device, comprises:

determining, through the processing device, a target encoding label node from the coding label tree, the target encoding label node having a number of encoding label subtrees greater than or equal to a predetermined number; and determining, through the processing device, at least the predetermined number of target encoding label subtrees from encoding label subtrees under the target encoding label node;

wherein the predetermined number is determined by:
determining, from the syntax parse tree, a syntax subtree comprising the entity concept through the processing device; and
determining, from the syntax subtree, a quantifier K corresponding to a cardinal number label through the processing device.

10. The non-transitory computer-readable medium of claim 9, wherein identifying, through the processing device and by using the web page parser, the entity concept from the title text of the target web page comprises:
obtaining, by using the web page parser, the page source code of the target web page;
locating, through the processing device, the title text from the page source code based on a title label; and
matching, through the processing device, the entity concept from the title text based on a predetermined set of entity concept words.

11. The non-transitory computer-readable medium of claim 9, wherein determining, from the syntax parse tree, the modifier for modifying the entity concept through the processing device comprises:
determining, through the processing device, a title text segment corresponding to the syntax subtree; and
determining, through the processing device, as the modifier an adjective in the title text segment that is closest to the entity concept.

12. The non-transitory computer-readable medium of claim 9, wherein the acts further comprise: calculating, through the processing device, a similarity between a first encoding label subtree and a second encoding label subtree of any two encoding label subtrees by:

in accordance with a determination that root nodes of the first encoding label subtree and the second encoding label subtree are not the same, determining, through the processing device, the similarity between the first encoding label subtree and the second encoding label subtree is equal to 0;

in accordance with a determination that the root nodes of the first encoding label subtree and the second encoding label subtree are the same, and that forward traversal results and backward traversal results of the first encoding label subtree and the second encoding label subtree are both the same, determining, through the processing device, the similarity between the first encoding label subtree and the second encoding label subtree is equal to 1;

in accordance with a determination that the root nodes of the first encoding label subtree and the second encoding label subtree are the same, and that the forward traversal results or the backward traversal results of the first encoding label subtree and the second encoding label subtree are not the same, determining, through the processing device, the similarity between the two encoding label subtrees by calculating $$s = 0.5 + 0.5 \times \frac{1}{N}\sum_{i=1}^{N} S_i,$$

where s represents the similarity between the two encoding label subtrees, N is a number of nodes at a first level in the first encoding label subtree, and $S_i$ represents a similarity between a first subtree having the $i^{th}$ node among the first level of nodes of the first encoding label subtree as a root node and a second subtree having the $i^{th}$ node among the first level of nodes of the second encoding label subtree as a root node.

* * * * *